(12) United States Patent
Takasu

(10) Patent No.: US 8,786,136 B2
(45) Date of Patent: Jul. 22, 2014

(54) ELECTRONIC APPARATUS AND COMMUNICATION CONTROL METHOD

(75) Inventor: Nobuaki Takasu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 13/035,853

(22) Filed: Feb. 25, 2011

(65) Prior Publication Data

US 2011/0210618 A1     Sep. 1, 2011

(30) Foreign Application Priority Data

Feb. 26, 2010   (JP) .................................. 2010-042899

(51) Int. Cl.
*H01F 27/42*     (2006.01)

(52) U.S. Cl.
USPC ........................................................ 307/104

(58) Field of Classification Search
USPC ........................................................ 307/104
See application file for complete search history.

(56) References Cited

U.S. PATENT DOCUMENTS

| 5,220,118 | A | 6/1993 | Konishi | |
|---|---|---|---|---|
| 8,250,218 | B2 * | 8/2012 | Watanabe et al. | 709/227 |
| 8,320,831 | B2 * | 11/2012 | Hashimoto et al. | 455/41.1 |
| 2007/0225038 | A1 | 9/2007 | Takeda | |
| 2009/0323108 | A1 * | 12/2009 | Shimma | 358/1.15 |
| 2010/0267334 | A1 * | 10/2010 | Hashimoto et al. | 455/41.2 |

FOREIGN PATENT DOCUMENTS

| EP | 2 202 675 A1 | 6/2010 |
|---|---|---|
| JP | 05-066772 | 3/1993 |
| JP | 07-177065 | 7/1995 |
| JP | 2007-257542 | 10/2007 |
| JP | 2008-154136 | 7/2008 |
| JP | 2009-277172 | 11/2009 |
| JP | 2010-021723 | 1/2010 |
| JP | 2011-030250 | 2/2011 |

OTHER PUBLICATIONS

Explanation of Non-English Language References.
Japanese Office Action mailed May 10, 2011 in Japanese Application No. 2010-042899, 10 pgs., which the present application claims priority.
Japanese Office Action mailed Jul. 2, 2013 in Japanese Application No. 2011-188931, 8 pgs., which is a division of the priority document to which the present application claims priority.

* cited by examiner

*Primary Examiner* — Jared Fureman
*Assistant Examiner* — Duc M Pham
(74) *Attorney, Agent, or Firm* — Knobbe, Martens, Olson & Bear, LLP

(57) ABSTRACT

According to one embodiment, an electronic apparatus includes a communication module, a connection request reception module, a connection establishing module, a disconnection request transmission module, and a connection control module. The communication module executes close proximity wireless transfer. The connection request reception module receives a connection request signal from an external device in close proximity to the communication module. The connection establishing module establishes a connection to the external device responding to reception of the connection request signal. The disconnection request transmission module transmits a disconnection request signal to the external device. The connection control module inhibits establishment of a connection until a non-reception period of the connection request signal continues for a threshold period or more after the connection is released in accordance with the disconnection request signal, and permits the establishment responding to the reception after the non-reception period has continued for the threshold period or more.

6 Claims, 11 Drawing Sheets

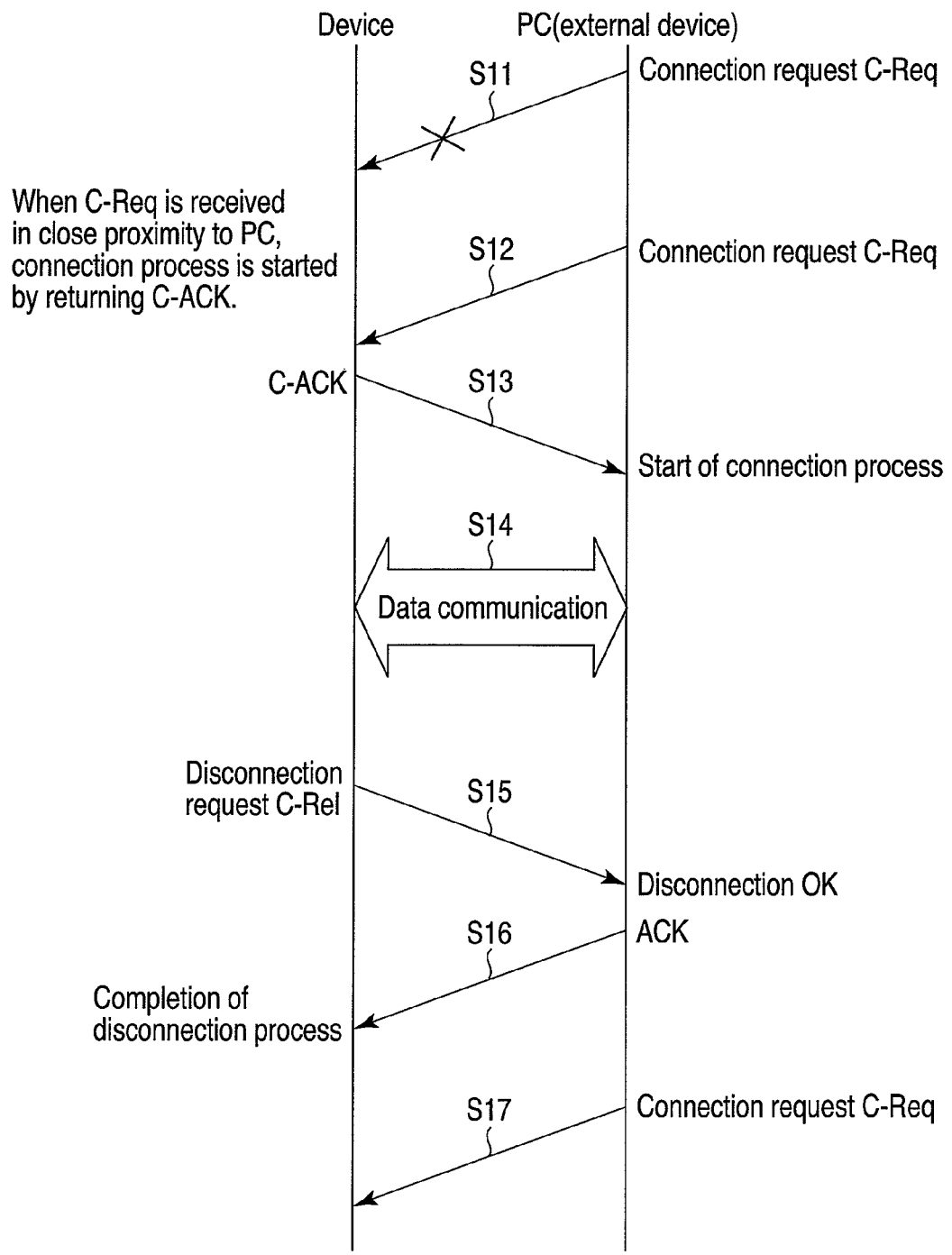
F I G. 5

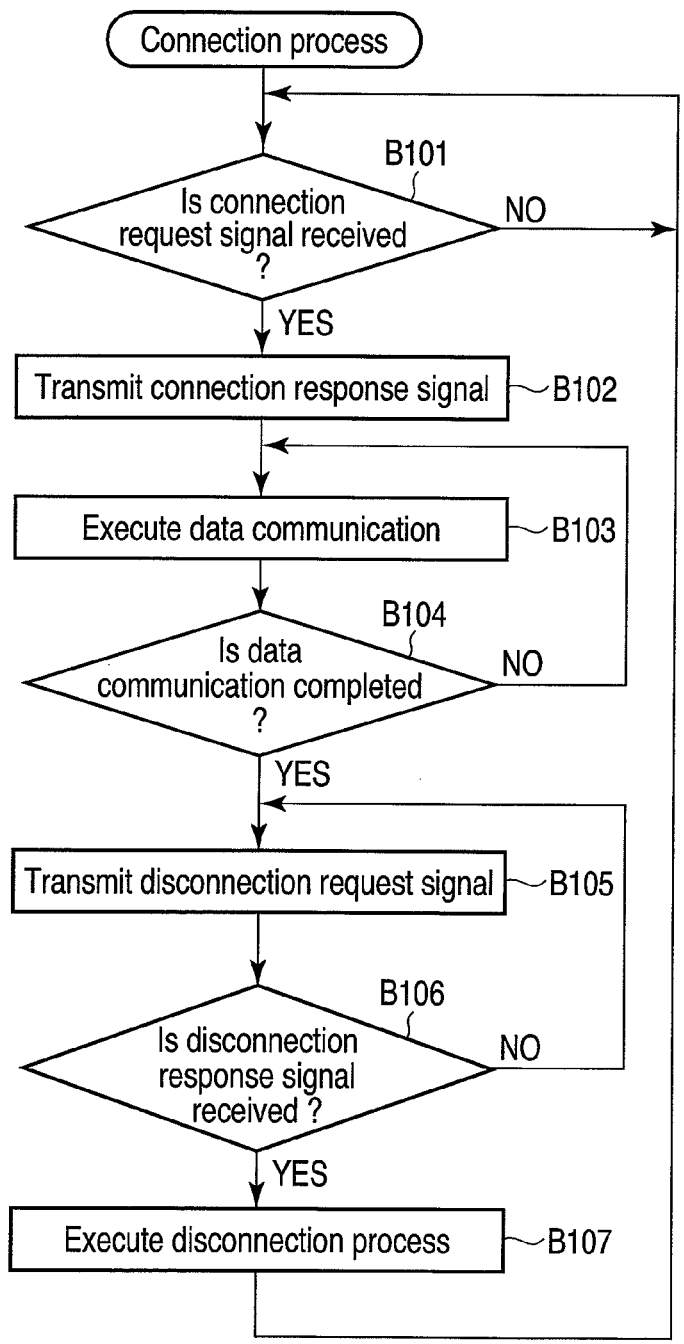
F I G. 10

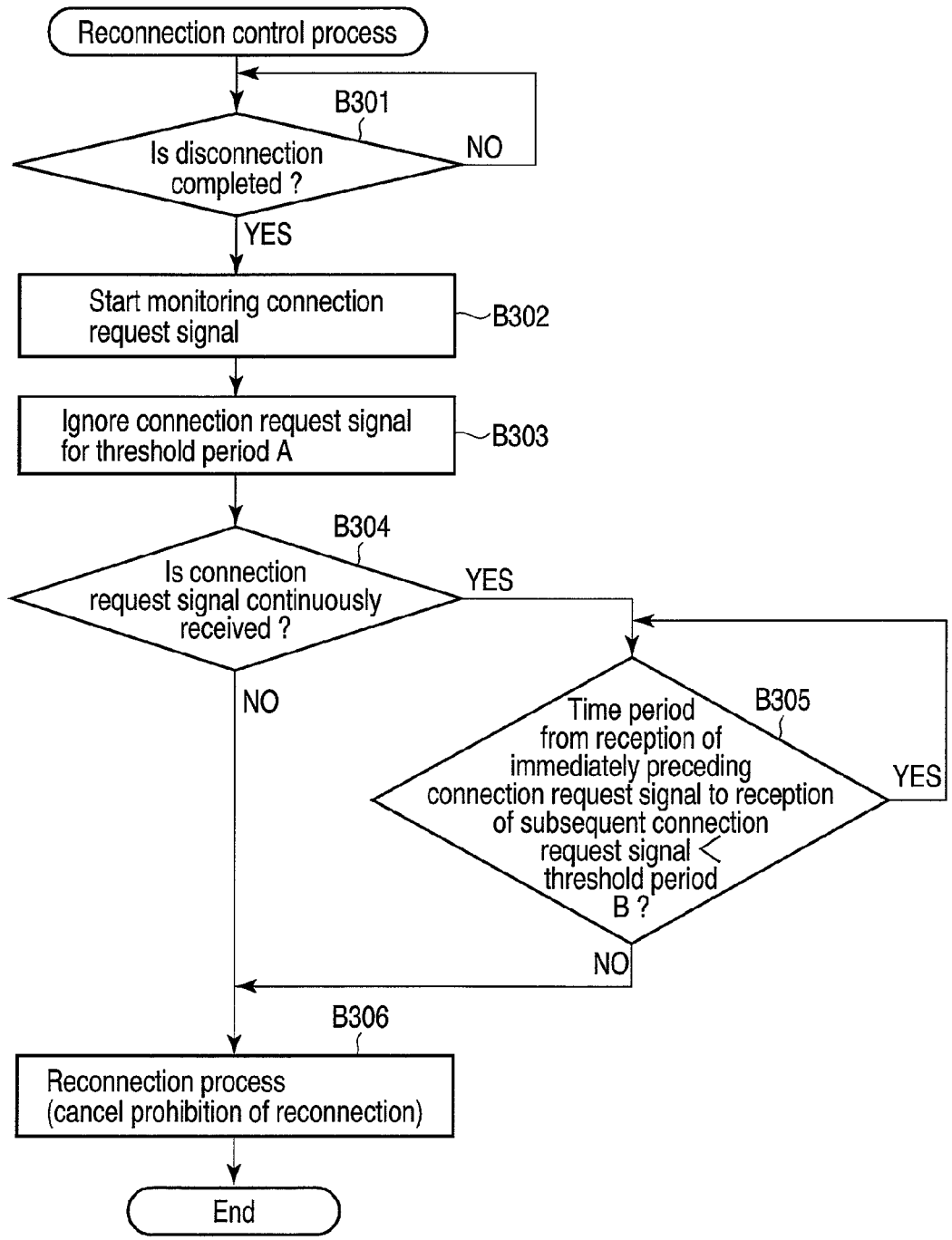
F I G. 12

ELECTRONIC APPARATUS AND COMMUNICATION CONTROL METHOD

CROSS-REFERENCE TO RELATED APPLICATIONS

This application is based upon and claims the benefit of priority from Japanese Patent Application No. 2010-042899, filed Feb. 26, 2010, the entire contents of which are incorporated herein by reference.

FIELD

Embodiments described herein relate generally to an electronic apparatus which executes close proximity wireless transfer, and a communication control method applied to the electronic apparatus.

BACKGROUND

In recent years, in IC cards, mobile phones, etc., wireless communication such as near field communication (NFC) has begun to be used. A user can easily execute communication for an authentication process, an accounting process, etc., simply by performing an operation of holding the IC card or mobile phone over a reader/writer module of a host apparatus.

Jpn. Pat. Appin. KOKAI Publication No. H7-177065 discloses a communication method which executes data communication only once during a time period in which a moving object, which moves on a conveyor, is in a communication-capable range. In this communication method, a presence confirmation signal is sent to the moving object and, it can be determined whether the moving object is within the communication-capable range based on a response from the moving object which responds to the presence confirmation signal.

In the meantime, in the close proximity wireless transfer method, there is such a demand that the execution of a service be automatically started simply by bringing devices close to each other. In the case of automatically executing a service simply by bringing devices close to each other, it is possible to realize, for example, a function of synchronizing the data stored in a mobile phone with the backup of the data stored in a personal computer, simply by bringing the mobile phone close to the personal computer. Thus, in the close proximity wireless transfer method, if the close proximity state of the devices is detected, a connection between the devices is automatically established.

However, if the devices are left in the close proximity state after the execution of the service is completed and the connection between the devices is then released, it is possible that the connection between the devices is established once again. If the execution of the service, which is to be executed between the devices, is already completed when the connection between the devices is established, the process of releasing the connection between the devices is executed once again. Consequently, it is possible that the connection between the devices, which are left in the close proximity state, are repeatedly established and released, despite the execution of the service being already completed.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 5 shows an example of a connection sequence between the electronic apparatus of the embodiment and an external device.

FIG. 10 is an exemplary flowchart illustrating an example of the procedure of a connection process which is executed by the electronic apparatus of the embodiment.

FIG. 12 is an exemplary flowchart illustrating another example of the procedure of the reconnection control process which is executed by the electronic apparatus of the embodiment.

DETAILED DESCRIPTION

Various embodiments will be described hereinafter with reference to the accompanying drawings.

In general, according to one embodiment, an electronic apparatus includes a communication module, a connection request reception module, a connection establishing module, a disconnection request transmission module, and a connection control module. A communication module executes close proximity wireless transfer. The connection request reception module receives a connection request signal from an external device which is in close proximity to the communication module. The connection establishing module establishes a connection to the external device in response to reception of the connection request signal. The disconnection request transmission module transmits a disconnection request signal to the external device. The connection control module inhibits establishment of a connection to the external device until a non-reception period of the connection request signal continues for a threshold period or more after the connection to the external device is released in accordance with the disconnection request signal, and permits the establishment of the connection to the external device in response to the reception of the connection request signal after the non-reception period has continued for the threshold period or more.

Figure 1:
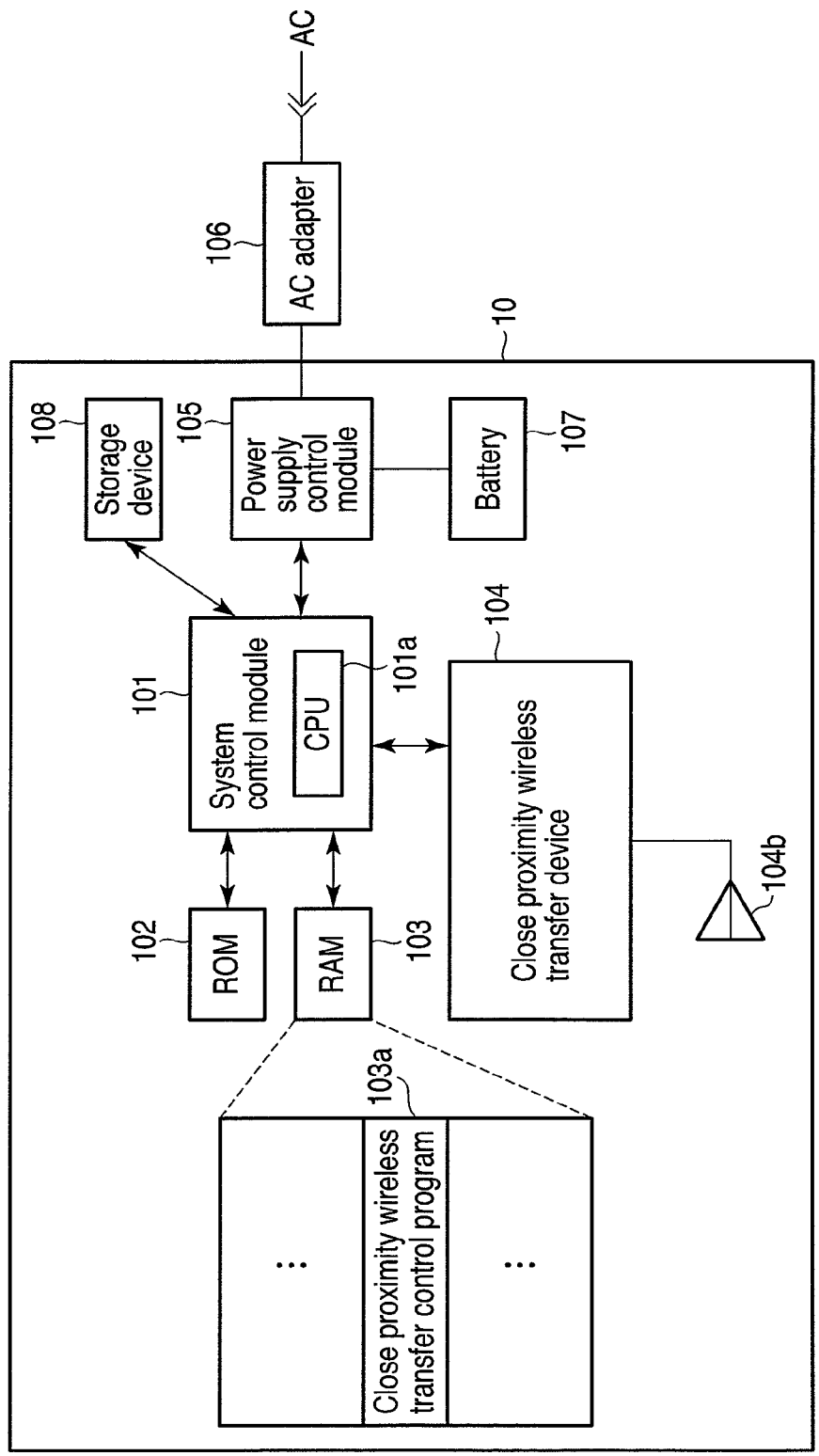
FIG. 1 is an exemplary block diagram showing the structure of an electronic apparatus according to an embodiment.

FIG. 1 shows the structure of an electronic apparatus according to an embodiment. The electronic apparatus is realized, for example, as a portable apparatus (e.g. a mobile phone, a PDA, an audio player, or an auxiliary storage medium), a personal computer, or a consumer apparatus (e.g. a TV or a video recorder). The electronic apparatus 10 includes a communication module which executes close proximity wireless transfer, establishes a wireless connection to some other device (external device) having a close proximity wireless transfer function, and executes close proximity wireless transfer with the external device in a peer-to-peer format.

This electronic apparatus 10 includes a system control module 101, a ROM 102, a RAM 103, a close proximity wireless transfer device 104, a power supply control module 105, an AC adapter 106, a battery 107 and a storage device 108.

The system control module 101 controls the operations of the respective components in the electronic apparatus 10. The system control module 101 includes a CPU 101a, and is connected to the ROM 102, RAM 103, close proximity wireless transfer device 104, power supply control module 105, and storage device 108.

The CPU 101a is a processor which loads instructions and data, which are stored in the ROM 102, into the RAM 103, and executes necessary processes. In the RAM 103, a close proximity wireless transfer control program 103a for controlling close proximity wireless transfer is loaded. The CPU 101a controls the close proximity wireless transfer device 104 by executing the close proximity wireless transfer control program 103a loaded in the RAM 103.

The close proximity wireless transfer device 104 is a communication module which executes close proximity wireless transfer. The close proximity wireless transfer device 104 establishes a wireless connection to some other device (external device) having a close proximity wireless transfer function, which is present within a predetermined distance from the close proximity wireless transfer device 104, and then starts transmission of data such as files. The close proximity wireless transfer between the close proximity wireless transfer device 104 and the external device is executed in a peer-to-peer format. The range of communication is, e.g. 3 cm. The wireless connection between the close proximity wireless transfer device 104 and the external device is enabled only when the close proximity wireless transfer device 104 and the external device are in close proximity, that is, only when the distance between the close proximity wireless transfer device 104 and the external device is decreased to the range of communication (e.g. 3 cm) or less. When the close proximity wireless transfer device 104 and the external device are brought close to each other within the range of communication, the wireless connection between the close proximity wireless transfer device 104 and the external device is established. Then, for example, the external device accesses a predetermined storage area in the storage device 108. That is, transmission of data by read of a data file from the predetermined storage area or write of a data file in the predetermined storage area is executed between the close proximity wireless transfer device 104 and the external device.

In the close proximity wireless transfer, an induction electric field is used. As a close proximity wireless transfer method, TransferJet, for instance, can be used. TransferJet is a close proximity wireless transfer method which uses UWB, and high-speed data transfer can be realized.

The close proximity wireless transfer device 104 is connected to an antenna 104b. The antenna 104b is an electrode called "coupler", and executes data transmission/reception to/from the external device by a wireless signal using an induction electric field. When the external device comes near within the range of communication (e.g. 3 cm) from the antenna 104b, the antennas (couplers) of the close proximity wireless transfer device 104 and the external device are coupled by the induction electric field, and thereby wireless communication between the close proximity wireless transfer device 104 and the external device is enabled. In the meantime, the close proximity wireless transfer device 104 and the antenna 104b can be realized as a single module.

The power supply control module 105 supplies power to the respective components in the electronic apparatus 10 by using power supplied from the outside via the AC adapter 106 or power supplied from the battery 107. In other words, the electronic apparatus 10 is driven by an external power supply such as an AC commercial power supply, or by the battery 107. The AC adapter 106 may be provided within the electronic apparatus 106.

Figure 2:
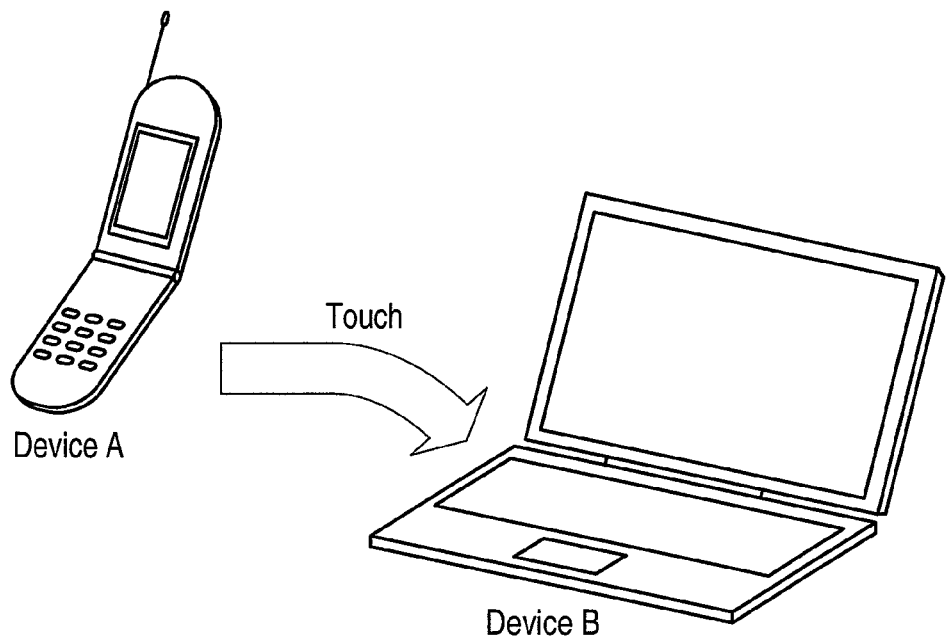
FIG. 2 shows an example of close proximity wireless transfer which is executed between the electronic apparatus of the embodiment and an external device.

FIG. 2 illustrates close proximity wireless transfer which is executed between two devices.

The case is assumed in which a device A is a mobile phone, and a device B is a portable computer. A user performs an operation ("touch operation") of bringing, for example, the device A close to the device B. Thereby, data transfer between the devices A and B can be started. The execution of the data transfer between the devices A and B is triggered when the devices A and B have been brought close to each other.

Figure 3:
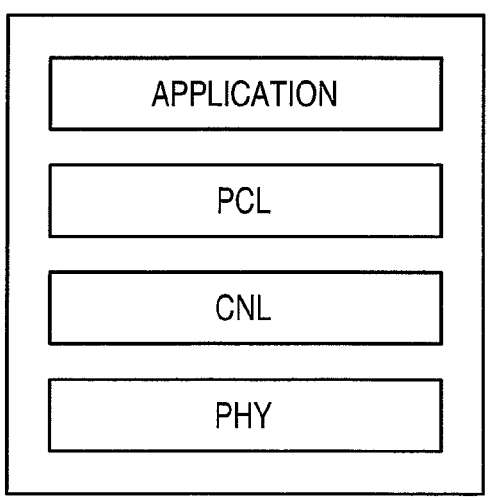
FIG. 3 shows an example of a software architecture for controlling close proximity wireless transfer, which is applied to the electronic apparatus of the embodiment.

FIG. 3 shows a software architecture for controlling close proximity wireless transfer which is executed with use of the close proximity wireless transfer device 104.

The software architecture of FIG. 3 shows a hierarchical structure of a protocol stack for controlling close proximity wireless transfer. The protocol stack includes a physical layer (PHY), a connection layer (CNL), a protocol conversion layer (PCL), and an application layer. For example, the connection layer (CNL), the protocol conversion layer (PCL) and the application layer can be realized by the wireless transfer control program 103a.

The physical layer (PHY) is a layer which controls physical data transfer, and corresponds to a physical layer in an OSI reference model. A part or all of the functions of the physical layer (PHY) may also be realized by using hardware in the close proximity wireless transfer device 104.

The physical layer (PHY) converts data from the connection layer (CNL) to a wireless signal. The connection layer (CNL) corresponds to a data link layer, a network layer and a transport layer in the OSI reference model. The connection layer executes a process of establishing a connection (CNL connection) between the close proximity wireless transfer device 104 and the external device, which are set in a close proximity state, and transmitting data.

The protocol conversion layer (PCL) corresponds to a session layer and a presentation layer in the OSI reference model, and is positioned between the application layer and the connection layer (CNL) for controlling establishment and release of the connection between the devices A and B. The protocol conversion layer (PCL) executes management of each application (communication program) in the application layer, and executes session control. The session corresponds to a communication path between the application layer of the electronic apparatus 10 and the application layer of the external device.

The application layer includes various communication programs (applications) corresponding to various application protocols (e.g. SCSI, OBEX, and other general-purpose protocols). The close proximity wireless transfer control program 103a of the embodiment has a function corresponding to the connection layer (CNL). In the meantime, the transfer control program 103a may have functions corresponding to the protocol conversion layer (PCL) and application layer.

Figure 4:
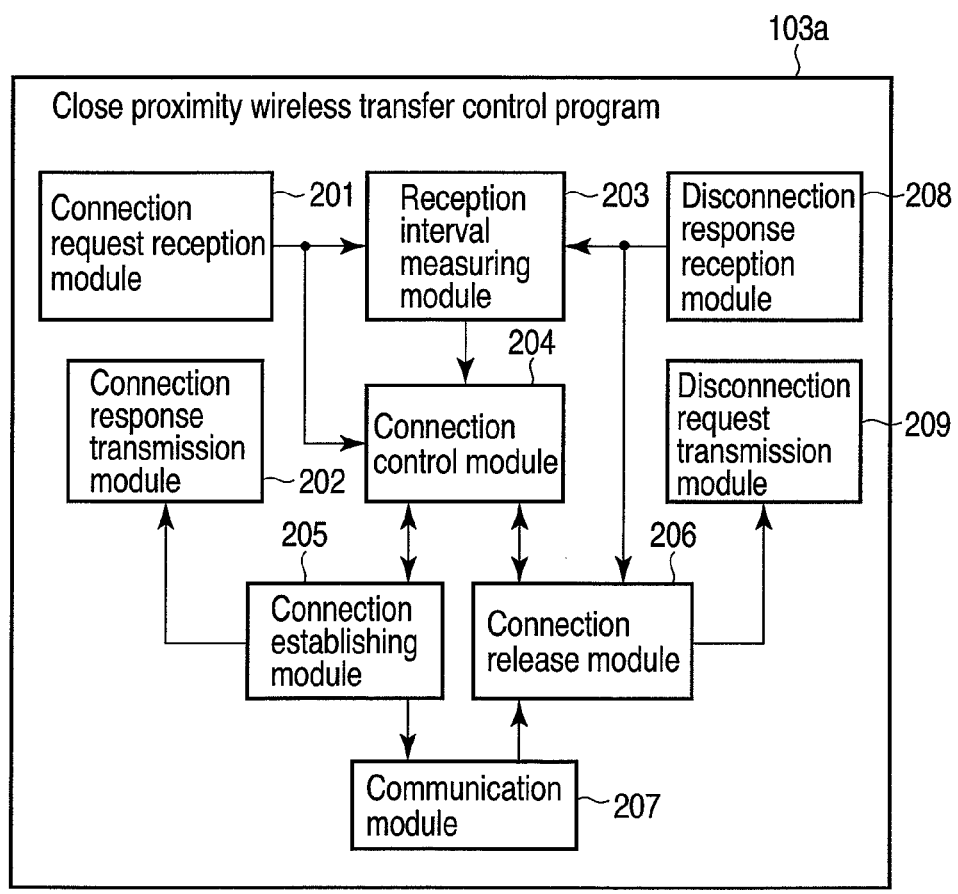
FIG. 4 is an exemplary block diagram showing the structure of a close proximity wireless transfer control program which is executed by the electronic apparatus of the embodiment.

FIG. 4 shows the structure of the close proximity wireless transfer control program 103a. The transfer control program 103a includes a connection request reception module 201, a connection response transmission module 202, a reception interval measuring module 203, a connection control module 204, a connection establishing module 205, a connection release module 206, a communication module 207, a disconnection response reception module 208, and a disconnection request transmission module 209.

The connection request reception module 201 receives a connection request signal transmitted from an external device which is in a close proximity state. Specifically, the connection request reception module 201 receives the connection request signal from the external device via the antenna 104b provided in the close proximity wireless transfer device 104. The connection request reception module 201 outputs the received connection request signal to the reception interval measuring module 203 and connection control module 204.

The connection response transmission module 202 transmits to the external device a connection response signal in response to the connection request signal. Specifically, when a connection to the external device is established in response to the connection request signal, that is, when a process of establishing a connection between the electronic apparatus 10 and the external device is executed by the connection establishing module 205, the connection response transmission module 202 transmits to the external device the connection response signal via the antenna 104b provided in the close proximity wireless transfer device 104. The external device establishes a connection to the electronic apparatus 10 by receiving the connection response signal transmitted from the connection response transmission module 202.

The disconnection request transmission module 209 transmits a disconnection request signal to the external device when data communication with the external device is completed. Specifically, when data communication with the external device is completed, the disconnection request transmission module 209 transmits a disconnection request signal to the external device via the antenna 104b provided in the close proximity wireless transfer device 104, thereby to release the connection between the electronic apparatus 10 and the external device by the connection release module 206.

The disconnection response reception module 208 receives a disconnection response signal transmitted from the external device in response to the disconnection request signal. The disconnection response reception module 208 outputs the received disconnection response signal to the reception interval measuring module 203 and the connection release module 206.

The reception interval measuring module 203 measures a non-reception period which is indicative of a period during which a connection request signal has not been received since the connection between the electronic apparatus 10 and the external device was released. The non-reception period includes a first period indicative of a period from when the connection between the electronic apparatus 10 and the external device is released to when a connection request signal is first received, and a second period indicative of a period from when a first connection request signal is received, after the release of the connection between the electronic apparatus 10 and the external device, to when a second connection request signal, which follows the first connection request signal, is received.

Accordingly, the reception interval measuring module 203 measures the first period from when the connection between the electronic apparatus 10 and the external device is released to when a connection request signal is first received. For example, the reception interval measuring module 203 calculates, as the first period, the period from when a disconnection response signal is received by the disconnection response reception module 208 to when a connection request signal is first received by the connection request reception module 201.

In addition, the reception interval measuring module 203 measures the second period from when a first connection request signal is received, after the release of the connection between the electronic apparatus 10 and the external device, to when a second connection request signal, which follows the first connection request signal, is received. For example, the reception interval measuring module 203 calculates, as the second period, the period from when the first connection request signal is received by the connection request reception module 201, after the reception of the disconnection response signal by the disconnection response reception module 208, to when the second connection request signal, which follows the first connection request signal, is received. The reception interval measuring module 203 outputs the measured first period or second period to the connection control module 204.

The connection control module 204 inhibits the establishment of a connection to the external device until the non-reception period of the connection request signal continues for a threshold period or more, after the connection to the external device was released in response to the disconnection request signal. The connection control module 204 then permits the establishment of a connection to the external device, in response to the reception of the connection request signal after the non-reception period has continued for the threshold period or more. Specifically, the connection control module 204 controls the permission or inhibition (prohibition) of the establishment of the connection between the electronic apparatus 10 and the external device, based on the first period or second period output by the reception interval measuring module 203. The connection control module 204 determines, based on the first period or second period, whether the user leaves the electronic apparatus 10 and the external device in the close proximity state after the release of the connection between the electronic apparatus 10 and the external device, or the user has performed the operation of bringing the electronic apparatus 10 and the external device close to each other once again ("re-touch operation") after once separating the electronic apparatus 10 and the external device (i.e. after releasing the close proximity state of the electronic apparatus 10 and external device). In other words, when the electronic apparatus 10 and the external device are kept in the close proximity state even after the connection between the electronic apparatus 10 and the external device was released, the connection control module 204 determines whether the electronic apparatus 10 and the external device are merely left in the close proximity state or the electronic apparatus 10 and the external device are kept in the close proximity state by the user's intentional re-touch operation. If the electronic apparatus 10 and the external device are merely left in the close proximity state, the connection control module 204 inhibits the establishment of a reconnection between the electronic apparatus 10 and the external device. On the other hand, if the electronic apparatus 10 and the external device are kept in the close proximity state by the user's intentional re-touch operation, the connection control module 204 permits the establishment of a reconnection between the electronic apparatus 10 and the external device.

If the first period is less than a threshold (e.g. one to two seconds) or if the second period is less than the threshold, the connection control module 204 inhibits the establishment of a connection between the electronic apparatus 10 and the external device. Specifically, if the first period is less than the threshold or if the second period is less than the threshold, the connection control module 204 controls the connection establishing module 205 so as not to carry out the process of establishing a connection between the electronic apparatus 10 and the external device, by discarding a connection request signal which is received by the connection request reception module 201. Alternatively, by not transmitting the connection response signal to the connection request signal, instead of discarding the connection request signal which is received by the connection request reception module 201, the connection control module 204 may control the connection establishing module 205 so as not to carry out the process of establishing a connection between the electronic apparatus 10 and the external device. In addition, if the first period is the threshold or more, or if the second period is the threshold or more, the connection control module 204 establishes a connection between the electronic apparatus 10 and the external device. Specifically, if the first period is the threshold or more, or if the second period is the threshold or more, the connection control module 204 controls the connection establishing module 205 so as to execute the process of establishing the connection between the electronic apparatus 10 and the external device by outputting the connection request signal received by the connection request reception module 201 to the connection establishing module 205. In order to determine whether the user has intentionally performed a retouch operation, the period (e.g. one to two seconds), which is assumed to be needed in order for the user to perform the retouch operation, is set as the threshold. Based on the second period alone, the connection control module 204 may control the permission or inhibition (prohibition) of the establishment of the connection between the electronic apparatus 10 and the external device. The reason for this is that even if the user, for example, performs the operation of separating the electronic apparatus 10 away from the external device immediately after the release of the connection, it is assumed that the connection request signal, which is transmitted from the external device on the order of, e.g. microseconds is received by the electronic apparatus 10 in a period of less than the threshold. In such a case, since it is highly possible that the first period is less than the threshold, the connection control module 204 can control the permission or inhibition (prohibition) of the establishment of the connection between the electronic apparatus 10 and the external device based on the second period alone.

Responding to the control (control signal) by the connection control module 204, the connection establishing module 205 establishes the connection between the electronic apparatus 10 and the external device. The connection establishing module 205 notifies the connection response transmission module 202 to transmit a connection response signal to the external device. The connection establishing module 205 further notifies the communication module 207 that the connection to the external device has been established.

The communication module 207 executes data communication with the external device, in response to the establishment of the connection to the external device by the connection establishing module 205. Responding to the completion of the data communication with the external device, the communication module 207 notifies the connection release module 206 of the completion of the data communication.

The connection release module 206 releases (disconnects) the connection with the external device in response to the notification of the completion of data communication from the communication module 207. The connection release module 206 notifies the disconnection request transmission module 209 to transmit a disconnection request signal to the external device. The connection release module 206 completes the process of releasing the connection to the external device, in response to a disconnection response signal from the external device, which has been received by the disconnection response reception module 208. In addition, the connection release module 206 notifies the connection control module 204 that the connection to the external device has been released.

By the above-described structure, the transfer control program 103a can inhibit the establishment of an unnecessary connection (reconnection) between the electronic apparatus 10 and the external device, after the release of the connection between the electronic apparatus 10 and the external device. In addition, the transfer control program 103a can establish a reconnection between the electronic apparatus 10 and the external device without a time lag, when the user intentionally performs a retouch operation. The transfer control program 103a controls the connection between the electronic apparatus 10 and the external device, for example, as illustrated in sequences which will be described later with reference to FIGS. 5 to 9.

The connection control module 204 may execute a process of ignoring a connection request signal that is received (i.e. a process of discarding a received connection request signal or not sending a connection response signal to a received connection request signal), assuming that an operation of separating the electronic apparatus 10 and the external device may possibly be performed during a predetermined period after the release of the connection between the electronic apparatus 10 and the external device. In this case, the connection control module 204 inhibits establishment of a reconnection to the external device by ignoring a connection request signal from the external device, which is received within a predetermined period (e.g. one to two seconds) after the release of the connection. When a connection request signal is continuously (on the order of, e.g. μ sec) received from the external device, the connection control module 204 inhibits establishment of a reconnection to the external device by ignoring the connection request signal. After ignoring a connection request signal from the external device, which is received within the predetermined period, the connection control module 204 inhibits establishment of a connection to the external device until a non-reception period of a connection request signal continues for a threshold period or more. Responding to the reception of a connection request signal after the non-reception period has continued for the threshold period or more, the connection control module 204 permits establishment of a connection to the external device. Specifically, if the time period (second period) is a threshold (e.g. one to two seconds) or more, the connection control module 204 permits the establishment of a reconnection between the electronic apparatus 10 and the external device. The second period is a time period from the reception of a first connection request signal from the external device, after the ignorance of a connection request signal from the external device which was received within the predetermined period from the release of the connection, to the reception of a second connection request signal which follows the first connection request signal.

FIG. 5 shows an example of the connection sequence between the electronic apparatus 10 and the external device. The external device is a personal computer, for example.

To start with, the external device transmits a connection request signal C-Req (S11). If a connection response signal C-ACK to the transmitted connection request signal C-Req is not received, the external device re-transmits a connection request signal C-Req (S12). As indicated by S11 and S12, the external device transmits the connection request signal C-Req at regular intervals (e.g. on the order of microseconds).

When the electronic apparatus 10 ("Device" in FIG. 5) is brought close to the external device and then receives the connection request signal C-Req, the electronic apparatus 10 returns a connection response signal C-ACK to the external device (S13). Responding to the reception of the connection response signal C-ACK, the external device starts a process of establishing a connection.

Responding to the establishment of the connection, the electronic apparatus 10 and external device execute data communication (S14). The data communication includes, for example, transmission of a file. Responding to the completion of the data communication, the electronic apparatus 10 transmits a disconnection request signal C-Rel to the external device (S15). Upon receiving the disconnection request signal C-Rel, the external device transmits a disconnection response signal ACK to the electronic apparatus 10 (S16). Responding to the reception of the disconnection response signal ACK, the electronic apparatus 10 completes a process of releasing the connection between the electronic apparatus 10 and the external device.

Subsequently, the external device transmits a connection request signal C-Req (S17). When the electronic apparatus 10 has received the connection request signal C-Req, the establishment of a connection between the devices, the data communication and the release of the connection, as indicated by S12 to S16, are executed once again.

As has been described above, when the electronic apparatus 10 has been brought close to the external device, the external device transmits a connection request signal at regular intervals, thereby to establish a connection between the electronic apparatus 10 and the external device. By receiving the connection request signal from the external device that is in close proximity to the electronic apparatus 10, the electronic apparatus 10 detects the external device which can communicate with the electronic apparatus 10. The electronic apparatus 10 can establish a connection to the external device by transmitting to the external device a connection response signal in response to the connection request signal.

The external device transmits a connection request signal at regular intervals. Accordingly, even after the release of the connection to the electronic apparatus 10, the external device continues to transmit the connection request signal. When an operation of separating the electronic apparatus 10 and the external device is performed, the connection request signal does not reach the electronic apparatus 10 and thus an unnecessary reconnection is not established. However, if the electronic apparatus 10 and the external device are kept (left) in a close proximity state after the connection between the electronic apparatus 10 and the external device is released, the electronic apparatus 10 transmits a connection response signal in response to the connection request signal from the external device, despite the necessary data communication being already completed. Thus, if the electronic apparatus 10 and the external device are kept in a close proximity state after the connection between the electronic apparatus 10 and the external device is released, it is possible that an unnecessary connection between the electronic apparatus 10 and the external device is established. For example, when the user backs up a file stored in the electronic apparatus 10 which is the mobile phone by transferring the file to the external device which is the personal computer, this transfer process may require a time of, e.g. several minutes. In this case, it is assumed that the user performs other works, in the state (close proximity state) in which the mobile phone is disposed on the communication position provided on the personal computer. In such a case, even after the completion of the transfer process (data communication), an unnecessary connection between the mobile phone and the personal computer is established since the close proximity state between the devices is maintained by leaving the mobile phone on the personal computer.

If such an unnecessary connection is established, this connection is released once again since the data communication to be established has already been completed. In other words, when the electronic apparatus 10 and the external device are maintained in the close proximity state, it is possible that the establishment and release of the connection between the devices are repeated, despite the data communication to be executed being already completed. In addition, in a method in which a reconnection is merely prohibited for a predetermined period after the connection between the electronic apparatus 10 and the external device is released, it is also possible that an unnecessary reconnection is established if the predetermined period is short. However, in the case where the predetermined period is set to be long, it is possible that a connection cannot be established, despite the user trying to establish a reconnection. This being the case, the close proximity wireless transfer control program 103a of the embodiment, as described above, controls a reconnection after the release of the connection between the electronic apparatus 10 and the external device, in accordance with the period in which a connection request signal transmitted from the external device to the electronic apparatus 10 is interrupted. Specifically, the close proximity wireless transfer control program 103a inhibits (prohibits) the establishment of a connection to the external device during a time period from when the connection to the external device is released in accordance with a disconnection request signal to when the non-reception period of a connection request signal (the period in which a connection request signal is interrupted) continues for a threshold period or more. The close proximity wireless transfer control program 103a then establishes a connection to the external device, in response to the reception of a connection request signal after the non-reception period has continued for the threshold period or more.

FIGS. 6 to 9 show examples of a sequence of controlling a reconnection between the electronic apparatus 10 (device) and an external device. In the examples of FIGS. 6 to 9, it is assumed that a connection is established between the electronic apparatus 10 and the external device, and data communication to be executed is completed.

Figure 6:
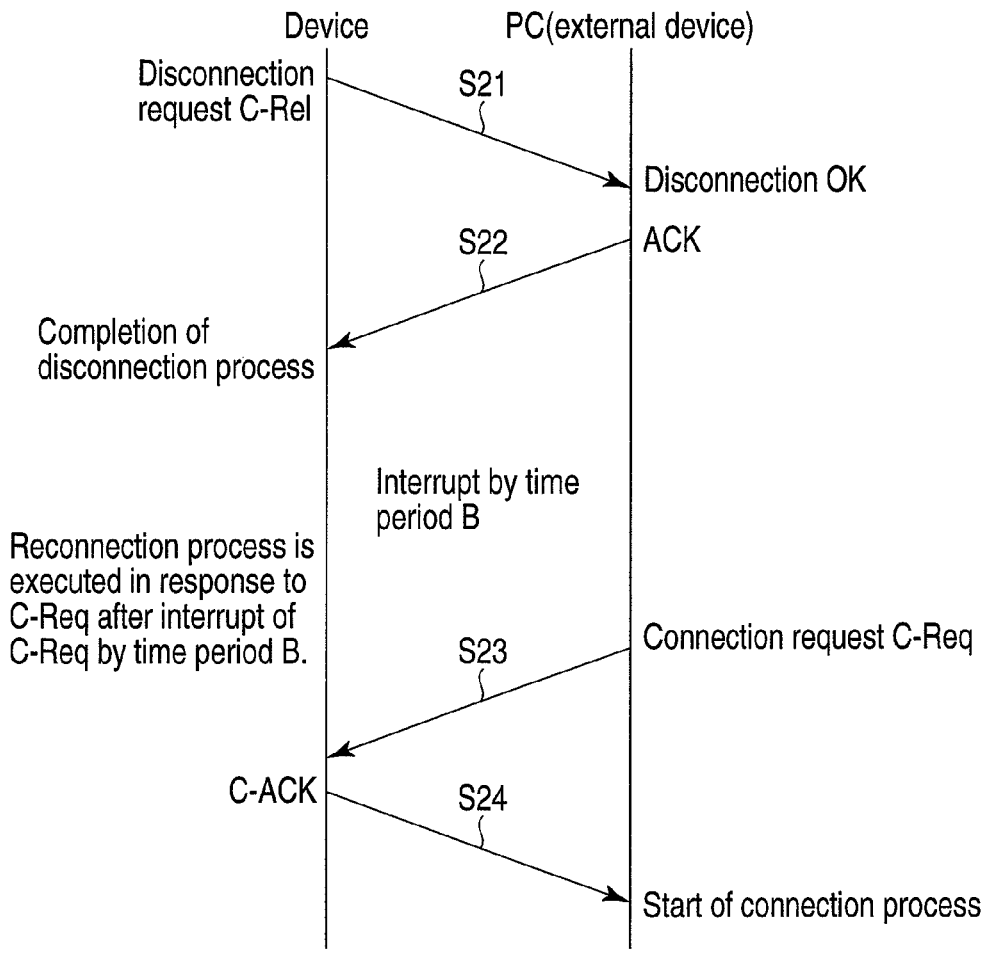
FIG. 6 shows an example of a sequence of controlling reconnection between the electronic apparatus of the embodiment and the external device.

In the example of FIG. 6, to start with, the electronic apparatus 10 transmits a disconnection request signal C-Rel to the external device (S21). Responding to the disconnection request signal C-Rel transmitted from the electronic apparatus 10, the external device transmits a disconnection response signal ACK to the electronic apparatus 10 (S22). Responding to the reception of the disconnection response signal ACK from the external device, the electronic apparatus 10 completes a process of releasing the connection to the external device.

If the time period from the completion of the connection release to the transmission of a new connection request signal C-Req from the external device is a threshold B or more (S23), or in other words, if the electronic apparatus 10 receives a new connection request signal C-Req after an interrupt of a connection request signal C-Req by the threshold B from the completion of the connection release, the electronic apparatus 10 transmits a connection response signal C-ACK to the external device in response to the received connection request signal C-Req (S24). Thus, if the time period from the completion of the release of the connection to the reception of the new connection request signal C-Req is the threshold B or more, the electronic apparatus 10 (transfer control program 103*a*) permits the establishment of a connection (reconnection) to the external device.

Figure 7:
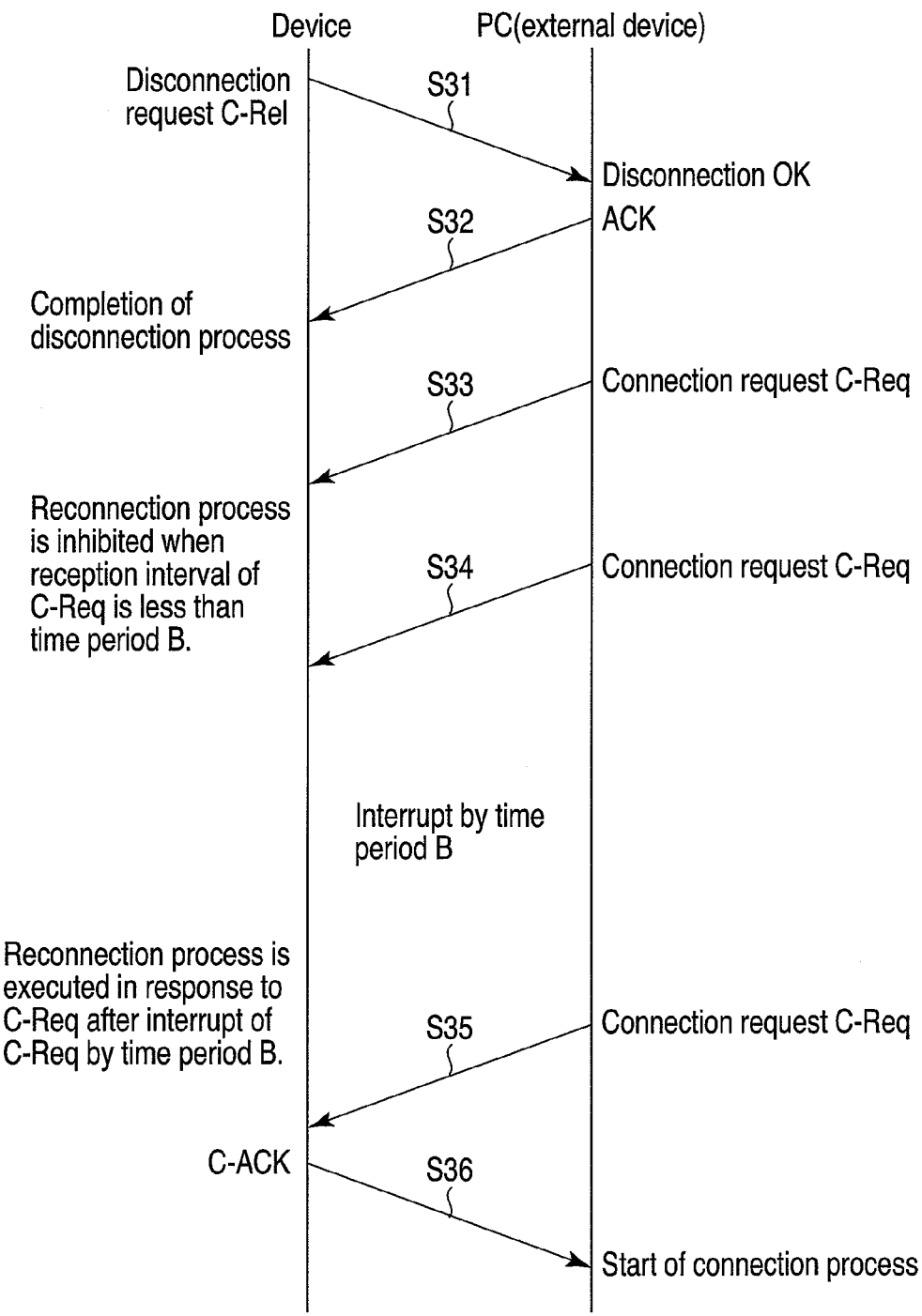
FIG. 7 shows another example of the sequence of controlling reconnection between the electronic apparatus of the embodiment and the external device.

In the example of FIG. 7, to start with, the electronic apparatus 10 transmits a disconnection request signal C-Rel to the external device (S31). Responding to the disconnection request signal C-Rel which is transmitted from the electronic apparatus 10, the external device transmits a disconnection response signal ACK to the electronic apparatus 10 (S32). Responding to the reception of the disconnection response signal ACK from the external device, the electronic apparatus 10 completes a process of releasing the connection to the external device.

If the time period from the completion of the release of the connection to the transmission of a new connection request signal C-Req from the external device is less than a threshold B (S33), or in other words, if the electronic apparatus 10 receives a new connection request signal C-Req before the end of an interrupt of a connection request signal C-Req by a threshold B from the completion of the connection release, the electronic apparatus 10 discards the received connection request signal C-Req (or does not send a connection response signal C-ACK to the connection request signal C-Req) and does not permit the establishment of a connection (reconnection) to the external device. Specifically, if the time period from the completion of the release of the connection to the reception of the connection request signal C-Req (S33) is less than the threshold B, the electronic apparatus 10 (transfer control program 103*a*) controls the transfer device 104, etc. so as to inhibit a reconnection to the external device.

Then, if the time period from the reception of the connection request signal C-Req indicated by S33 to the reception of a subsequent connection request signal C-Req is less than the threshold B (S34), or in other words, if the interrupt of a connection request signal C-Req is less than the threshold B, the electronic apparatus 10 discards the received connection request signal C-Req (or does not send a connection response signal C-ACK to the connection request signal C-Req) and does not permit the establishment of a connection (reconnection) to the external device. Specifically, if the time period from the reception of the connection request signal C-Req (S33) to the reception of a subsequent connection request signal C-Req (S34) is less than the threshold B, the electronic apparatus 10 (transfer control program 103*a*) controls the transfer device 104, etc. so as to inhibit a reconnection to the external device.

Then, if the time period from the reception of the connection request signal C-Req indicated by S34 to the reception of a subsequent connection request signal C-Req is the threshold B or more (S35), or in other words, if a connection request signal C-Req is interrupted by the threshold B, the electronic apparatus 10 permits the establishment of a connection (reconnection) to the external device. Accordingly, in response to the received connection request signal C-Req, the electronic apparatus 10 transmits a connection response signal C-ACK to the external device (S36). Thus, if the time period from the reception of the connection request signal C-Req (S34) to the reception of a subsequent connection request signal C-Req (S35) is the threshold B or more, the electronic apparatus 10 (transfer control program 103*a*) controls the transfer device 104, etc. so as to establish a reconnection to the external device.

Responding to the connection response signal C-ACK which is transmitted from the electronic apparatus 10, the external device starts a process of establishing a connection to the electronic apparatus 10.

Figure 8:
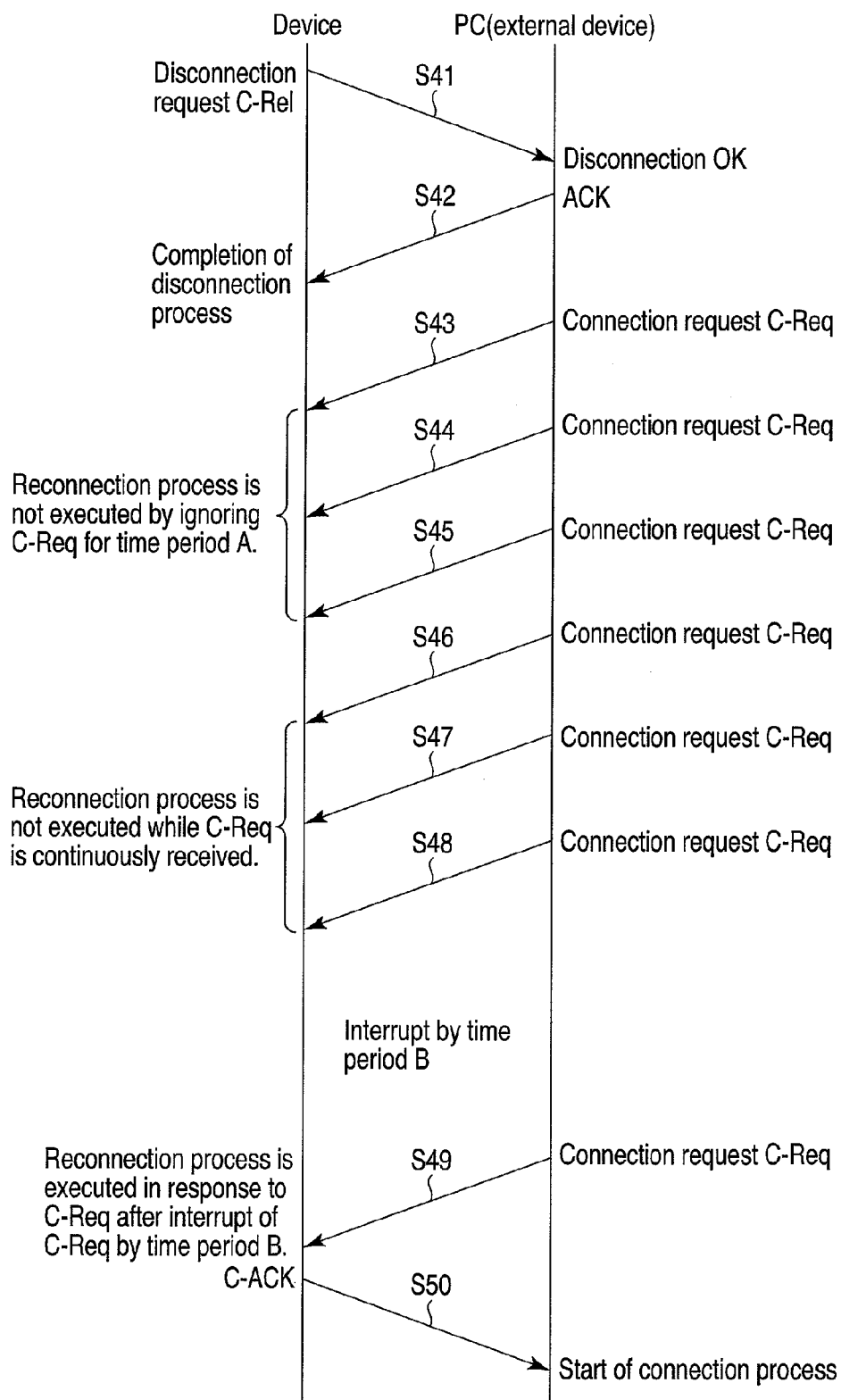
FIG. 8 shows still another example of the sequence of controlling reconnection between the electronic apparatus of the embodiment and the external device.

In the example of FIG. 8, to start with, the electronic apparatus 10 transmits a disconnection request signal C-Rel to the external device (S41). Responding to the disconnection request signal C-Rel which is transmitted from the electronic apparatus 10, the external device transmits a disconnection response signal ACK to the electronic apparatus 10 (S42). Responding to the reception of the disconnection response signal ACK from the external device, the electronic apparatus 10 completes a process of releasing the connection to the external device.

After the completion of the release of the connection, the electronic apparatus 10 ignores received connection request signals C-Req for a time period corresponding to a threshold A (S43, S44, S45). Specifically, within the period corresponding to the threshold A after the completion of the release of the connection, the electronic apparatus 10 discards received connection request signals C-Req (or does not transmit a connection response signal C-ACK to the connection request signal C-Req), and does not execute a process of establishing a connection (reconnection) to the external device.

After ignoring the connection request signals C-Req for the time period corresponding to the threshold A, the electronic apparatus 10 ignores successively received connection request signals C-Req (S46, S47, S48). Specifically, after ignoring the connection request signals C-Req for the time period corresponding to the threshold A, the electronic apparatus 10 further measures intervals of receiving connection request signals C-Req. If the electronic apparatus 10 receives a connection request signal C-Req at predetermined intervals (e.g. on the order of microseconds), that is, if the interval of reception of a connection request signal C-Req is less than a predetermined time period, the electronic apparatus 10 discards received connection request signals C-Req (or does not transmit a connection response signal C-ACK to the connection request signal C-Req), and does not execute a process of establishing a connection (reconnection) to the external device. When the electronic apparatus 10 has received the connection request signals C-Req indicated by S43 to S48, or in other words, if the electronic apparatus 10 has successively received the connection request signals C-Req after the completion of the release of connection, the electronic apparatus 10 (transfer control program 103*a*) controls the transfer device 104, etc. so as to inhibit a reconnection to the external device.

Then, if the time period from the reception of the connection request signal C-Req indicated by S48 to the reception of a subsequent connection request signal C-Req is the threshold B or more (S49), or in other words, if a connection request signal C-Req is interrupted by the threshold B, the electronic apparatus 10 permits the establishment of a connection (reconnection) to the external device. Accordingly, in response to the received connection request signal C-Req, the electronic apparatus 10 transmits a connection response signal C-ACK to the external device (S50). Thus, if the time period from the reception of the connection request signal C-Req (S48) to the reception of a subsequent connection request signal C-Req (S49) is the threshold B or more, the electronic apparatus 10 (transfer control program 103*a*) controls the close proximity wireless transfer device 104, etc. so as to establish a reconnection to the external device.

Responding to the connection response signal C-ACK transmitted from the electronic apparatus 10, the external device starts a process of establishing a connection to the electronic apparatus 10.

FIGS. 6 to 8 show the examples in which a disconnection request signal C-Rel is first transmitted to the external device from the electronic apparatus 10. On the other hand, in the example of FIG. 9, a disconnection request signal C-Rel is first transmitted to the electronic apparatus 10 from the external device (S51). Responding to the reception of the disconnection request signal C-Rel from the external device, the electronic apparatus 10 transmits a disconnection response signal ACK to the external device (S52). Responding to the reception of the disconnection response signal ACK from the electronic apparatus 10, the external device completes a process of releasing the connection to the electronic apparatus 10. This is realized by providing the disconnection response reception module 208 with a function of receiving a disconnection request signal and providing disconnection request transmission module 209 with a function of transmitting a disconnection response signal.

Figure 9:
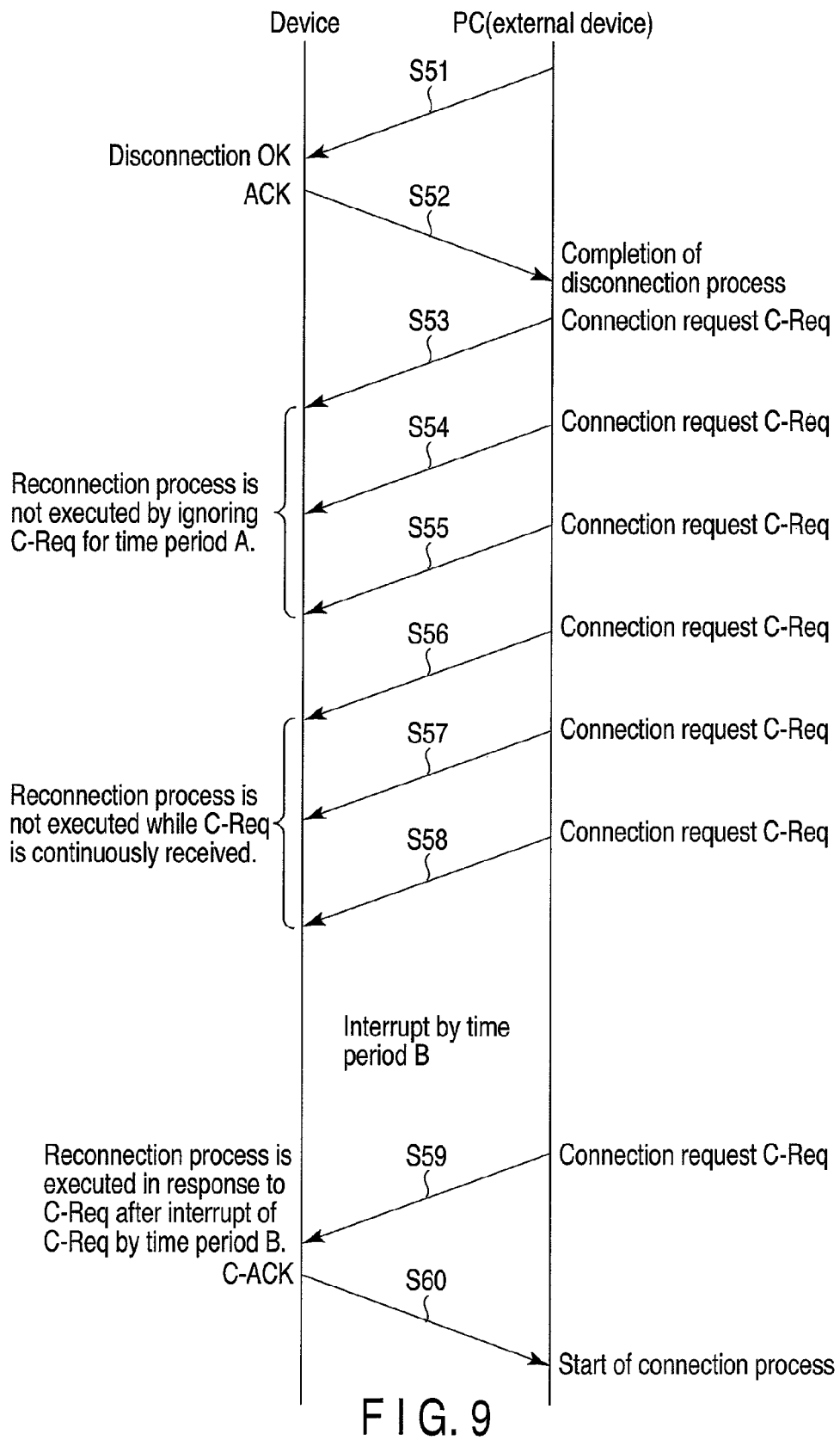
FIG. 9 shows still another example of the sequence of controlling reconnection between the electronic apparatus of the embodiment and the external device.

Also in the above case where the disconnection request signal C-Rel is transmitted to the electronic apparatus 10 from the external device, the transfer control program 103a executes the process of controlling the connection (reconnection) between the devices, as in the example shown in FIG. 8. Thus, the sequence of S53 to S60 in FIG. 9 is processed in the same manner as the sequence of S43 to S50 in FIG. 8.

A flowchart of FIG. 10 illustrates an example of the procedure of a connection process which is executed by the close proximity wireless transfer control program 103a. In order to execute data communication between the electronic apparatus 10 and the external device, the transfer control program 103a controls the establishment and release of the connection between the devices.

To start with, the transfer control program 103a determines whether a connection request signal, which requests a connection, has been received from the external device (block B101). Specifically, the transfer control program 103a determines whether a connection request signal from the external device, which is in close proximity to the electronic apparatus 10, has been received via the close proximity wireless transfer device 104 (antenna 104b). The external device transmits the connection request signal at regular intervals (e.g. on the order of microseconds). If the connection request signal is not received (NO in block B101), the transfer control program 103a executes the process of block B101 once again.

If the connection request signal is received (YES in block B101), the transfer control program 103a transmits a connection response signal to the external device in response to the connection request signal (block B102). Thereby, a connection between the electronic apparatus 10 and the external device is established.

Subsequently, the transfer control program 103a executes data communication between the electronic apparatus 10 and the external device (block B103). The data communication is, for example, transmission of a file. The transfer control program 103a then determines whether the data communication between the electronic apparatus 10 and the external device is completed (block B104). If the data communication is not completed (NO in block B104), the transfer control program 103a further executes the data communication by returning to the process of block B103.

On the other hand, if the data communication is completed (YES in block B104), the transfer control program 103a transmits to the external device a disconnection request signal which requests releasing the connection between the electronic apparatus 10 and the external device (block B105). The transfer control program 103a then determines whether a disconnection response signal, which responds to the disconnection request signal, has been received from the external device (block B106). If the disconnection response signal has not been received (NO in block B106), the transfer control program 103a transmit the disconnection request signal once again by returning to the process of block B105. Instead of transmitting the disconnection request signal once again, the transfer control program 103a may determine once again whether the disconnection response signal has been received, after waiting for a predetermined time.

If the disconnection response signal has been received (YES in block B106), the transfer control program 103a executes a process of releasing the connection between the electronic apparatus 10 and the external device (block B107). Then, the transfer control program 103a repeats the process beginning from block B101. In other words, the transfer control program 103a repeatedly executes the establishment of the connection to the external device, the data communication and the release of the connection.

By the above-described process, the transfer control program 103a can execute the data communication between the electronic apparatus 10 and the external device. The electronic apparatus 10 receives the connection request signal which is transmitted from the external device that is in the close proximity state, and then executes the establishment of the connection to the external device, the data communication and the release of the connection.

Figure 11:
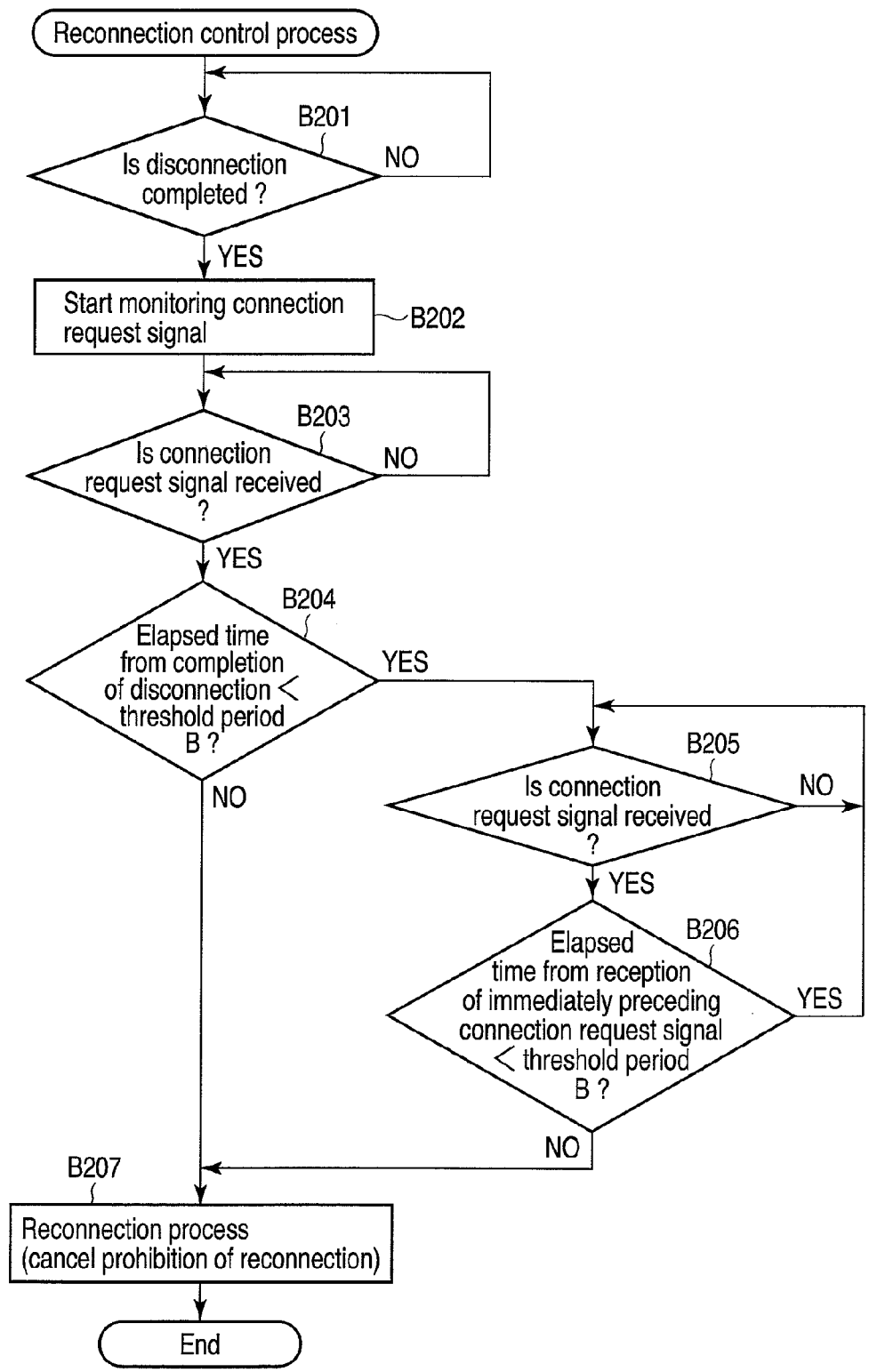
FIG. 11 is an exemplary flowchart illustrating an example of the procedure of a reconnection control process which is executed by the electronic apparatus of the embodiment.

After the connection between the devices is released, the transfer control program 103a further executes a process of inhibiting an unnecessary reconnection. A flowchart of FIG. 11 illustrates an example of the procedure of a reconnection control process which is executed by the close proximity wireless transfer control program 103a. In this reconnection control process, the transfer control program 103a discards a connection request signal which is continuously received after the release of the connection between the electronic apparatus 10 and the external device (or does not transmit a connection response signal C-ACK to the connection request signal C-Req), and inhibits (prohibits) a reconnection.

To start with, the transfer control program 103a determines whether the process of releasing the connection between the electronic apparatus 10 and the external device is completed (block B201). If the process of releasing the connection between the electronic apparatus 10 and the external device is not completed (NO in block B201), the transfer control program 103a determines whether the process of releasing the connection between the electronic apparatus 10 and the external device is completed, once again, by the process of block B201.

If the process of releasing the connection between the electronic apparatus 10 and the external device is completed (YES in block B201), the transfer control program 103a starts monitoring a connection request signal which is sent from the external device (block B202). Then, the transfer control program 103a determines whether the connection request from the external device has been received (block B203). If the connection request signal has not been received (NO in block B203), the transfer control program 103a determines whether the connection request signal from the external device has been received, once again, by the process of block B203.

On the other hand, if the connection request signal has been received (YES in block B203), the transfer control program 103a calculates a first period indicative of a period from the completion of the process of releasing the connection between the electronic apparatus 10 and the external device to the reception of a first connection request signal thereafter, and determines whether the first period is less than a threshold period B (block B204). If the first period is less than the threshold period B (YES in block B204), the transfer control program 103a inhibits the establishment of a connection between the electronic apparatus 10 and the external device, and then determines whether a connection request signal, which follows the immediately preceding received connection request signal, has been received (block B205). If the connection request signal, which follows the immediately preceding received connection request signal, has not been received (NO in block B205), the transfer control program 103a determines whether the connection request signal, which follows the immediately preceding received connection request signal, has been received, once again, by the process of block B205.

If the connection request signal, which follows the immediately preceding received connection request signal, has been received (YES in block B205), the transfer control program 103a calculates a second period indicative of a period from the reception of the immediately preceding connection request signal to the reception of the subsequent connection request signal which follows the immediately preceding connection request signal, and then determines whether the second period is less than the threshold period B (block B206). If the second period is less than the threshold period B (YES in block B206), the transfer control program 103a inhibits the establishment of a connection between the electronic apparatus 10 and the external device. Then, the transfer control program 103a further determines whether a subsequent connection request signal has been received by returning to the process of block B205.

If the first period is not less than the threshold period B (NO in block B204), or if the second period is not less than the threshold period B (NO in block B206), the transfer control program 103a executes the process of re-establishing the connection between the electronic apparatus 10 and the external device (block B207). In other words, the transfer control program 103a cancels the prohibition of establishment of a reconnection between the electronic apparatus 10 and the external device.

By the above-described process, the transfer control program 103a can inhibit the establishment of an unnecessary reconnection after the release of the connection between the electronic apparatus 10 and the external device.

A flowchart of FIG. 12 illustrates another example of the procedure of the reconnection control process which is executed by the close proximity wireless transfer control program 103a.

To start with, the transfer control program 103a determines whether the process of releasing the connection between the electronic apparatus 10 and the external device is completed (block B301). If the process of releasing the connection between the electronic apparatus 10 and the external device is not completed (NO in block B301), the transfer control program 103a determines whether the process of releasing the connection between the electronic apparatus 10 and the external device is completed, once again, by the process of block B301.

If the process of releasing the connection between the electronic apparatus 10 and the external device is completed (YES in block B301), the transfer control program 103a starts monitoring a connection request signal which is sent from the external device (block B302). Then, the transfer control program 103a ignores a connection request signal which has been received within a threshold period A (e.g. one to two seconds) after the completion of the connection release process (i.e. the transfer control program 103a discards the connection request signal or does not transmit a connection response signal to the connection request signal) (block B303).

Subsequently, the transfer control program 103a determines whether a connection request from the external device has continuously been received (block B304). If the connection request signal has continuously been received (YES in block B304), the transfer control program 103a calculates a second period indicative of a period from the reception of the immediately preceding connection request signal to the reception of the subsequent connection request signal which follows the immediately preceding connection request signal, and then determines whether the second period is less than a threshold period B (block B305). If the second period is less than the threshold period B (YES in block B305), the transfer control program 103a inhibits the establishment of a connection between the electronic apparatus 10 and the external device. Then, the transfer control program 103a further determines whether a subsequent connection request signal has been received within the period less than the threshold period B by returning to the process of block B305.

If the connection request signal has not continuously been received (NO in block B304), or if the second period is not less than the threshold period B (NO in block B305), the transfer control program 103a executes the process of re-establishing the connection between the electronic apparatus 10 and the external device (block B306). In other words, the transfer control program 103a cancels the prohibition of establishment of a reconnection between the electronic apparatus 10 and the external device.

By the above-described process, the transfer control program 103a can inhibit the establishment of an unnecessary reconnection after the release of the connection between the electronic apparatus 10 and the external device. In addition, since the establishment of an unnecessary reconnection can be inhibited, it is also possible to inhibit the activation/termination of an application program for communication, the output of sound and the turn-on/off of LEDs, which would occur due to the establishment of connection. Therefore, the power consumption can also be reduced.

As has been described above, according to the embodiment, an unnecessary connection between the devices can be inhibited. The electronic apparatus 10 inhibits the establishment of an unnecessary reconnection, which would occur when the electronic apparatus 10 and the external device are kept in a close proximity state after the release of the connection to the external deice. When the electronic apparatus 10 and the external device are merely kept in a close proximity state, the electronic apparatus 10 inhibits the establishment of a reconnection by determining that a reconnection is unnecessary. On the other hand, if the electronic apparatus 10 and the external device are once separated away from each other and then set in a close proximity state by the operation (re-touch operation) of bringing the electronic apparatus 10 and the external device close to each other, the electronic apparatus 10 permits the establishment of a reconnection by determining that a reconnection is necessary.

All the procedures of the connection control process in this embodiment may be executed by software. Thus, the same advantageous effects as with the present embodiment can easily be obtained simply by installing a computer program, which executes the procedures of the connection control process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a communication module configured to execute close proximity wireless transfer; and
a connection control module configured to control an establishment of a connection to an external device when a connection request signal is received from the external device which is configured to transmit the connection request signal every first period, wherein the connection control module is configured
to prevent the establishment of the connection to the external device while a second period in which the connection request signal is not received is shorter than a threshold period, after the external device is disconnected, the threshold period longer than the first period, and
to permit the establishment of the connection to the external device in response to the connection request signal if the second period is equal to or longer than the threshold period.

2. The electronic apparatus of claim 1, wherein the connection control module is configured to prevent the establishment of the connection to the external device by ignoring the connection request signal for the threshold period after the disconnection to the external device.

3. The electronic apparatus of claim 1, wherein the connection control module is configured to ignore the connection request signal for the threshold period after the disconnection to the external device, to subsequently prevent the establishment of the connection to the external device while the second period is shorter than the threshold period, and to permit the establishment of the connection to the external device in response to the reception of the connection request signal if the second period is equal to or longer than the threshold period.

4. The electronic apparatus of claim 1, further comprising a reception interval measuring module configured to measure a reception interval of the connection request signal received from the external device, wherein the connection control module is configured
to discard the connection request signal for the threshold period after the external device is disconnected,
to continuously discard the connection request signal after the threshold period from the disconnection to the external device has passed and if the reception interval measured by the reception interval measuring module is less than or equal to the threshold period,
to prevent the establishment of the connection to the external device while the second period is shorter than the threshold period, and
to permit the establishment of the connection to the external device in response to the reception of the connection request signal if the second period is equal to or longer than the threshold period.

5. The electronic apparatus of claim 1,
wherein the connection control module is configured to prevent the establishment of the connection to the external device while the second period is shorter than the threshold period, after the disconnection to the external device in accordance with the disconnection request signal from the external device, and to permit the establishment of the connection to the external device, in response to the reception of the connection request signal after the second period has been equal to or longer than the threshold period.

6. A communication control method of controlling close proximity wireless transfer by a communication module, the method comprising:
controlling an establishment of a connection to an external device when a connection request signal is received from the external device which is configured to transmit the connection request signal every first period, wherein the controlling comprises
preventing an establishment of the connection to the external device while a second period in which the connection request signal is not received is shorter than a threshold period, after the external device is disconnected, the threshold period being longer than the first period; and
permitting the establishment of the connection to the external device in response to the connection request signal if the second period is equal to or longer than the threshold period.

* * * * *